Sept. 26, 1944.　　　K. E. GRANSTEDT　　　2,359,034
TOBACCO LEAF CUTTING DEVICE
Filed March 10, 1942　　　2 Sheets-Sheet 2
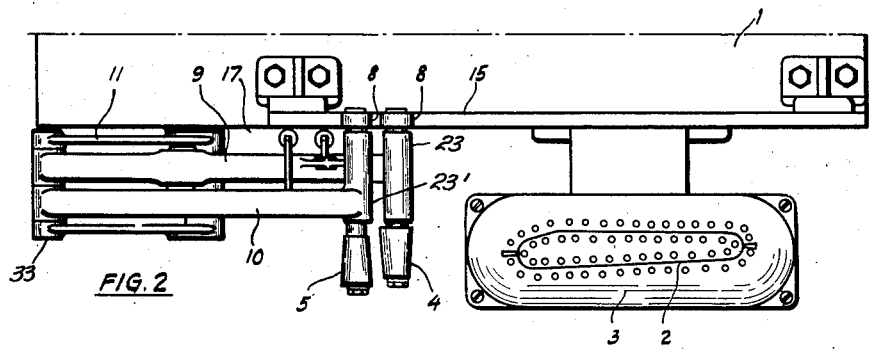
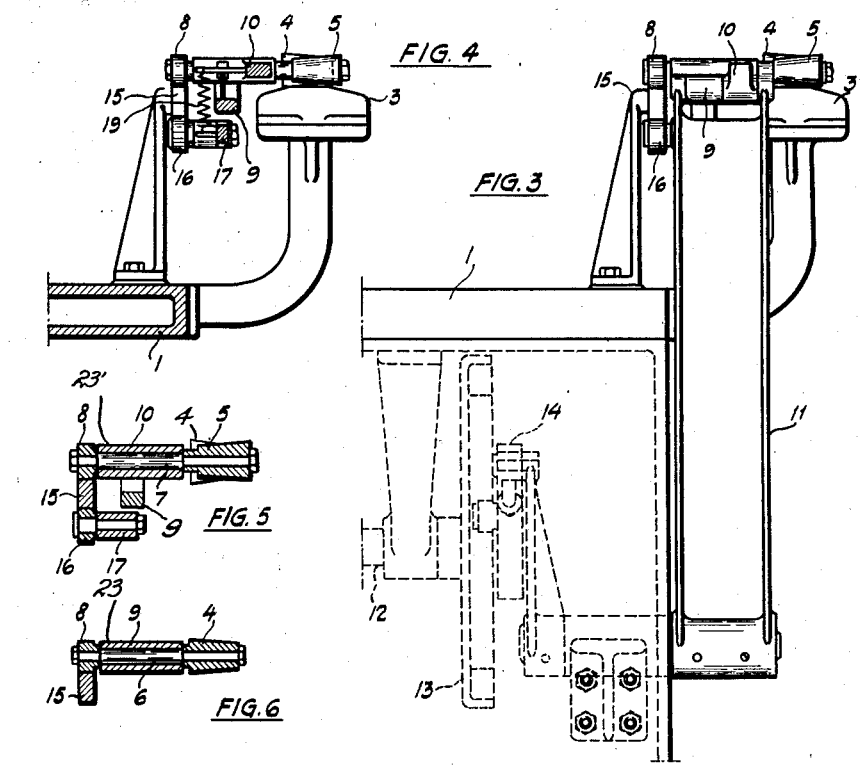
Inventor
Karl E. Granstedt
by Sommers + Young
Attorneys Patented Sept. 26, 1944

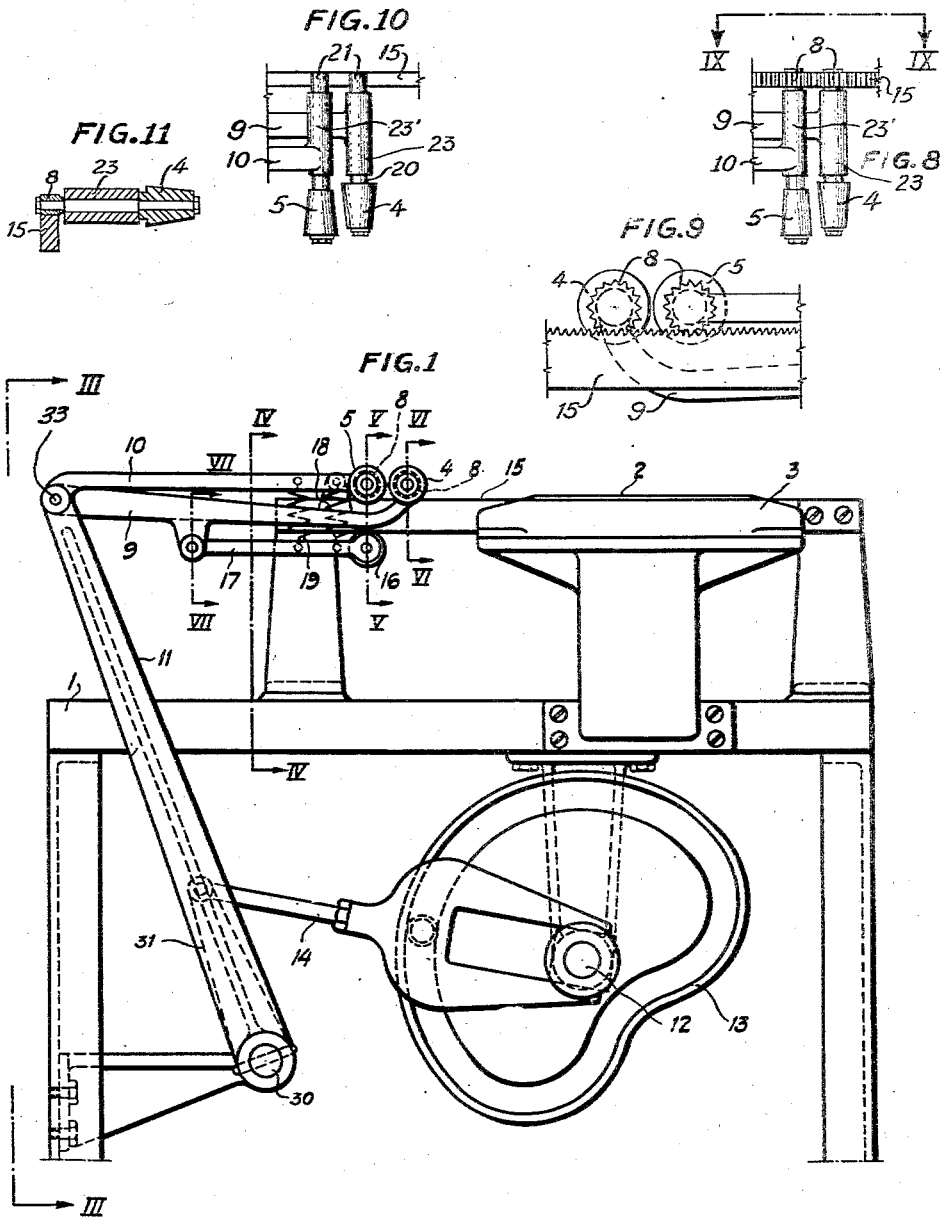

2,359,034

UNITED STATES PATENT OFFICE 2,359,034

TOBACCO LEAF CUTTING DEVICE

Karl Erik Granstedt, Stockholm, Sweden, assignor to Aktiebolaget Formator, Stockholm, Sweden, a Swedish joint-stock company Application March 10, 1942, Serial No. 434,142
In Germany January 30, 1941

5 Claims. (Cl. 131—103)

This invention relates to means for cutting tobacco leaves, such as cigar wrappers or binders spread out upon a cutting die. In the operation of such means it might occur that the leaf cutting roller when moving into contact with a leaf upon the cutting die displaces the leaf and curls it up and damages same, because the roller will not instantly obtain its full rotary velocity when it contacts the leading end of the cutting die. For that reason, the edge of the cutting die as well as the cutting roller might also be damaged. These drawbacks will be still more serious in case the cutting roller does not contact the cutting edge of the die at the proper level.

It is an object of my invention to provide means to assure full rotary cutting velocity of the cutting rollers before they have been moved into cutting relationship with a leaf placed onto the cutting die, and this will be attained by the use of means that do not increase the space hitherto necessary for the provision of cutting means.

Another object of my invention consists in the provision of durable means for imparting to the cutting rollers irrespective of their shape a full rotary velocity before they have been moved into cutting relationship with the tobacco leaf placed onto the cutting die.

Still another object of my invention consists in the provision of simple, efficient and durable means for setting the cutting roller or rollers into rotation at full velocity and maintaining the rollers at a proper level with the cutting edge, until they have contacted its leading end.

Still another object of my invention consists in the provision of simple and efficient means to rapidly set the cutting rollers into rotation as they approach the cutting bed thus avoiding undue pressure on the cutting die.

To the accomplishment of the foregoing and such other objects as may hereinafter appear, my invention resides in the construction and novel combination of parts fully described hereinafter, illustrated in the accompanying drawings, and pointed out in the claims appended hereto, it being understood that various changes in the form, proportion and arrangement within the scope of the claims may be resorted to without departing from the spirit of my invention.

In the drawings:

Fig. 1 is a side elevational view of part of a machine comprising an embodiment of the leaf cutting device;

Fig. 2 is a plan view of the cutting device;

Fig. 3 is an end view on the line III—III of Fig. 1;

Figs. 4 to 7 are sectional views on the lines IV—IV, V—V, VI—VI and VII—VII, respectively, of Fig. 1;

Fig. 8 is a plan view of a modified embodiment of drive means for the cutting rollers adapted for use in place of the drive means shown in Fig. 2;

Fig. 9 is a fragmentary elevational view on an enlarged scale, taken on the line IX—IX of Fig. 8;

Fig. 10 is a view similar to Fig. 8 but illustrating still another embodiment; and Fig. 11 is a view similar to Fig. 6 but illustrating a modified embodiment.

Referring to the drawings, a cutting bed 3 having a cutting die 2 is secured to the machine frame 1. Two frusto-conical leaf cutting rollers 4 and 5 are movable in a straight path over the cutting die 2 in its longitudinal direction to cut out a wrapper from a tobacco leaf spread out upon said die. The cutting rollers 4 and 5 are each secured to one end of a spindle 6 and 7, respectively, and a driving roller 8 is secured to the other end of each spindle. The spindles 6 and 7 are each rotatably journalled in the hubs 23, 23' of supporting arms 9 and 10, respectively, which are pivoted at 33 to a rocking lever arm 11 secured to a rocking shaft 30. To the shaft 30 is also secured an arm 31 and to said arm is pivoted a rod 14 which is reciprocated by a cam disc 13 secured to a rotary driving shaft 12 whereby the lever arm 11 will reciprocate the cutting rollers 4 and 5 over the cutting die 2. Thereby the rollers 8 ride upon a rolling race formed by the upper surface of a guide bar 15 which is disposed laterally and extends longitudinally of the cutting die 2, so that the rollers 8 are set into rotation and rotate the cutting rollers 4 and 5, whereby the latter attain their full rotary velocity before they have been moved into cutting relationship with the tobacco leaf on the cutting bed 3. The upper surface of the bar 15, i. e. the rolling race, is positioned at such a level relatively to the cutting edge of the die 2 that the rollers 4, 5 will run onto said cutting edge without jumping, and the coefficient of friction of the rollers 8 and the rolling race formed by the bar 15 can be so great that the advancing cutting rollers will obtain their full rotary velocity even though the path of movement of said cutting rollers when approaching the tobacco leaf is very short. Thus, as shown in Figs. 8 and 9, the driving rollers 8 as well as the rolling race might have rough or fluted contacting surfaces, if desired. Furthermore, as shown in Fig. 11, the driving rollers 8 might be so small that the cutting rollers 4 and 5 when contacting the tobacco leaf have attained a rotary speed somewhat higher than during the cutting operation, so that the tobacco leaf placed upon the cutting bed 3 will be subjected to a slight pulling action in a rearward direction (to the left in Fig. 2) and stretched slightly at the leading end of the cutting die 2 before the cutting proper is commenced. Thereby a very clean cut is obtained.

Provisions are also made to obtain a sufficient downwardly directed pressure of the driving rollers 8 and to obviate undue variations of said pressure. For that purpose, the driving rollers 8 and cutting rollers 4 and 5 are yieldingly pressed against the rolling race and cutting die by means that are connected to a holder riding on the lower side of the bar 15. Thus a roller 16 is rotatably journalled on an arm 17, which is pivoted to the arm 9 and connected to the arms 9 and 10 by means of tension springs 18 and 19 which press the rollers 8 downwards against the upper side of the bar 15 and the roller 16 upwards against the lower side of same. By this arrangement, as illustrated in Fig. 1, the tension power of the springs 18 and 19 is substantially constant during the travel of the driving rollers upon the bar 15, and it will increase very slightly when the cutting rollers 4 and 5 begin riding upon the cutting die 2 and lift the driving rollers 8 slightly out of contact with the bar 15.

In the preferred construction now described the cutting rollers 4 and 5 are driven by rollers 8 forming a longitudinal extension of the cutting rollers 4 and 5 and being detachably connected to them, but it might instead thereof be possible to provide for the same purpose an integral longitudinal extension of the cutting rollers. As shown in Fig. 10 the rollers 4 and 5 each has a pin 20, which is rotatably journalled in the hub 23 of the arms 9 and 10, respectively. The ends 21 of the pins 20 ride upon the friction bar 15, so that the cutting rollers 4 and 5 are by friction set into rotation. In the preferred construction now described, the cutting rollers 4 and 5 are driven by rollers 8 forming a longitudinal extension of the cutting rollers 4 and 5 which are detachably connected to them, but it might instead thereof be possible to provide for the same purpose an integral longitudinal extension of the cutting rollers. As shown in Fig. 10 the rollers 4 and 5 each has a pin 20, which is rotatably journalled in the hubs 23, 23' of the arms 9 and 10, respectively. The ends 21 of the pins 20 ride upon the friction bar 15, so that the cutting rollers 4 and 5 are set into rotation by friction.

I claim:

1. In a tobacco leaf cutting device, a leaf cutting die, a guide member having an upper surface and a lower surface extending longitudinally of said cutting die, a lever arm, a supporting arm pivotally connected to said lever arm and being directed substantially longitudinally of said guide member, a leaf cutting roller having a longitudinal extension adapted to roll upon said upper surface of said guide member and being rotatably mounted on said supporting arm, a holder movably connected to said lever arm, means yieldingly interconnecting said supporting arm and said holder to press said cutting roller extension against said upper surface of said guide member and said holder against said lower surface of said guide member, and means for driving said lever arm to move said extension of said cutting roller upon said guide member to be rotated by frictional engagement and put said cutting roller into rotation when it approaches said cutting die.

2. In a tobacco leaf cutting device, a leaf cutting die, a guide member having an upper surface and a lower surface extending longitudinally of said cutting die, a lever arm, two supporting arms pivotally connected to said lever arm and being directed substantially longitudinally of said guide member, a leaf cutting roller having a longitudinal extension adapted to roll upon said upper surface of said guide member and being rotatably mounted on one of said supporting arms, and a guide roller rotatably mounted on the other supporting arm, means yieldingly interconnecting said supporting arms to press said cutting roller extension against said upper surface of said guide member and said guide roller against said lower surface of said guide member, and means for driving said lever arm to move said extension of said cutting roller upon said guide member to be rotated by frictional engagement and put said cutting roller into rotation when it approaches said cutting die.

3. In a tobacco leaf cutting device, a leaf cutting die, a guide member having an upper surface and a lower surface extending longitudinally of said cutting die, a lever arm, a supporting arm pivotally connected to said lever arm and being directed substantially longitudinally of said guide member, a leaf cutting roller having a longitudinal extension adapted to roll upon said upper surface of said guide member and being rotatably mounted on said supporting arm, another supporting arm pivotally connected to the first supporting arm and being directed substantially longitudinally of said guide member and having a rotatably mounted guide roller, means for yieldingly interconnecting said supporting arms to press said cutting roller extension against said upper surface of said guide member and said guide roller against said lower surface of said guide member, and means for driving said lever arm to move said extension of said cutting roller upon said guide member to be rotated by frictional engagement and put said cutting roller into rotation when it approaches said cutting die.

4. In a tobacco leaf cutting device, a leaf cutting die, a leaf cutting roller movable over and longitudinally of said die, a rolling race positioned laterally of said cutting die and projecting longitudinally beyond the leading end of said die, a driving friction roller connected to said cutting roller laterally of the path of travel of said cutting roller and adapted by frictional engagement to roll upon said rolling race and thereby to revolve said cutting roller, and means for moving said driving roller upon said rolling race to set said driving roller and thereby also said cutting roller into rotation when said cutting roller approaches said cutting die, said cutting die and said rolling race being in such relative positions as to cause said driving roller to elevate from said rolling race when said cutting roller contacts with said cutting die.

5. In a tobacco leaf cutting device, a leaf cutting die, a leaf cutting roller movable over and longitudinally of said die, a rolling race positioned laterally of said cutting die and projecting longitudinally beyond the leading end of said die, said cutting roller having a longitudinal extension adapted by frictional engagement to roll upon said rolling race and thereby to revolve said cutting roller, and means for moving said roller extension upon said rolling race to put said cutting roller into rotation when it approaches said cutting die, said cutting die and said rolling race being in such relative positions as to cause said extension to elevate from said rolling race when the cutting roller contacts with said cutting die.

KARL ERIK GRANSTEDT.